No. 783,096. PATENTED FEB. 21, 1905.
W. J. BOOTH.
GRAIN SCOURING APPARATUS.
APPLICATION FILED FEB. 17, 1904.
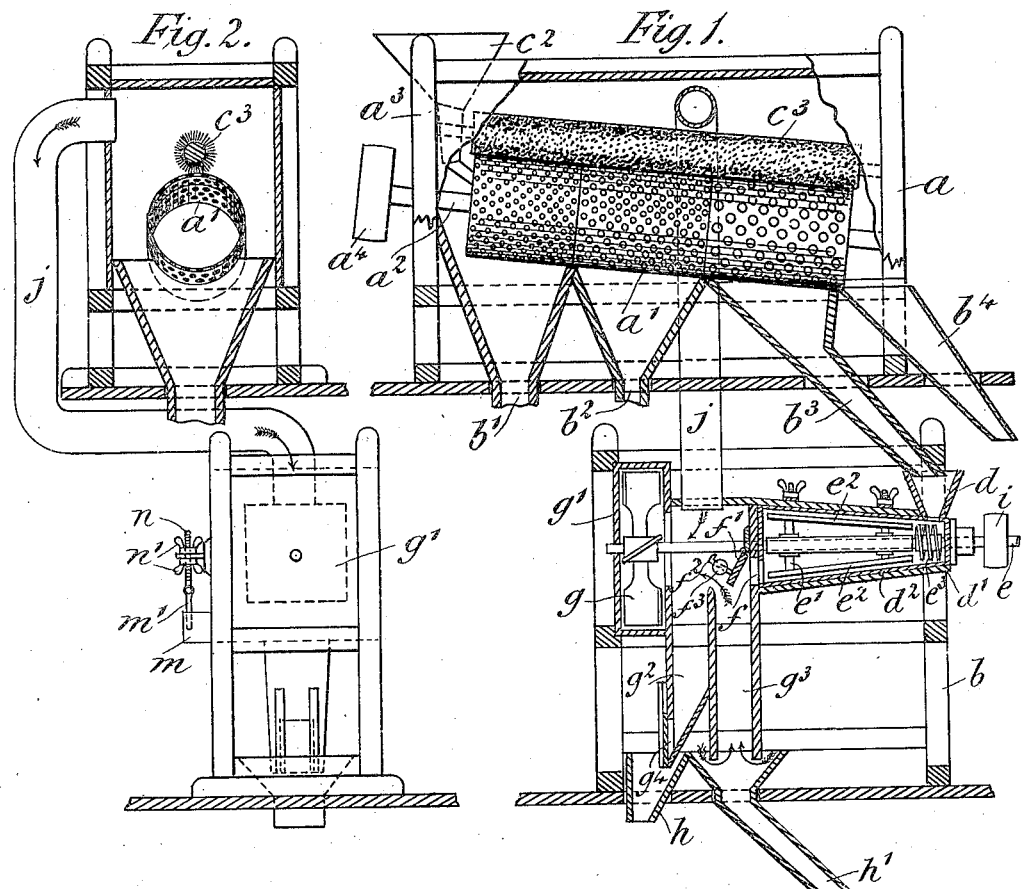
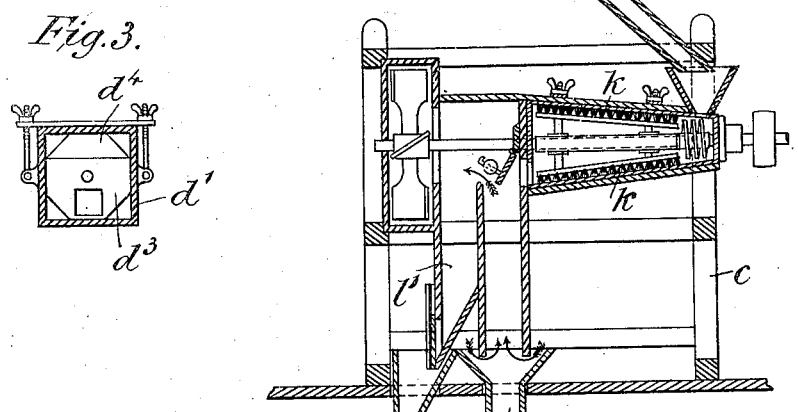
Witnesses:
John C. O'Shea
J. Spriggs Poole
Inventor.
William J. Booth.
by Herbert W. T. Jenner
Attorney.

UNITED STATES PATENT OFFICE.

WILLIAM JONATHAN BOOTH, OF PARK WORKS, CONGLETON, ENGLAND.

GRAIN-SCOURING APPARATUS.

SPECIFICATION forming part of Letters Patent No. 783,096, dated February 21, 1905.

Application filed February 17, 1904. Serial No. 193,997.

*To all whom it may concern:*

Be it known that I, WILLIAM JONATHAN BOOTH, residing at Park Works, Congleton, in the county of Chester, England, have invented certain new and useful Improvements in Grain-Scouring Apparatus; and I do hereby declare the following to be a full, clear, and exact description of the invention, such as will enable others skilled in the art to which it appertains to make and use the same.

This invention relates to machines for cleaning or scouring grain; and it consists in the novel construction and combination of the parts hereinafter fully described and claimed.

In the accompanying drawings, Figure 1 is a side elevation, partly in section, of the complete plant or apparatus. Fig. 2 is an end view, partly in section, of a part of the plant or apparatus shown in Fig. 1; and Fig. 3 is a detail hereinafter referred to.

The improved plant or apparatus comprises a grading-machine $a$, a scouring-machine $b$, and a machine $c$ for brushing and finishing the grain, all arranged one under the other, as shown in Fig. 1.

The grading-machine comprises a grading-cylinder $a'$, carried by a shaft $a^2$, mounted in the frame $a^3$, capable of being revolved by the pulley $a^4$. The grading-cylinder is formed with holes or perforations in different sizes or meshes and in three sets, the first taking out dust and other fine refuse, which passes down the chute $b'$, the second taking out the broken grain and the like, which passes down the chute $b^2$, and the third allowing the good grain to pass through the chute $b^3$ to the scouring-machine, while stones, straw, and other foreign bodies tail out over the end of the cylinder and pass down the waste-chute $b^4$. The grain is fed into the grading-cylinder through the chute $c^2$, and a cylindrical brush $c^3$ is mounted over and in frictional contact with the grading-cylinder, the object of which is to probe out and clear any of the holes or perforations which may become clogged or stopped.

The grain passing through the chute $b^3$ enters a hopper $d$, leading into a casing $d'$, containing an octagonal lining $d^2$, which is shown in end view, Fig. 3, and this octagonal lining is formed in two parts $d^3$ $d^4$. Through the lining and casing a horizontal shaft $e$ passes, furnished with radial arms $e'$, carrying beaters $e^2$, while on the said shaft a worm $e^3$ is mounted or formed just below the bottom of the hopper $d$ for propelling the grain forward, while at the forward extremity of the casing or lining an opening $f$ is provided covered by a hinged door $f'$, furnished with a projecting arm $f^2$, carrying an adjustable balance-weight $f^3$, and on the farther extremity of the shaft $e$ a fan $g$ is mounted, contained within a fan-box $g'$. Between the extremity of the casing $d'$ and the fan $g$ two chutes $g^2$ $g^3$ are arranged, the chute $g^2$ being normally closed by an automatic door $g^4$, beneath which a discharging-chute $h$ is arranged, while the chute $g^3$ communicates with the chute $h'$, leading to the brushing and finishing machine, and the shaft $e$ is provided with a pulley $i$, whereby it may be revolved.

The grain after passing through the hopper $d$ is fed forward by the screw or worm $e^3$ and is beaten by the revolving beaters $e^2$ and is drawn through the opening $f$ by the action of the fan, the said opening being regulated by the door $f'$ and weighted balance-arm $f^2$ $f^3$, and the good grain passes down the chutes $g^3$ $h'$ to the brushing and finishing machine, and the light grain passes down the chute $g^2$, while the dust is drawn through the fan $g$.

The casing inclosing the grading-cylinder is connected, by means of a pipe $j$, with the front of the fan-casing, so that dust may be drawn from the said casing through the pipe and fan.

The grain passes from the scouring-machine to the brushing and finishing machine, which is practically identical in its construction to the scouring-machine with the exception that the beaters $e^2$ are replaced by stiff brushes $k$, and after passing through the machine the good and finished grain is delivered through the chute $l$, while the lighter grain passes down the chute $l'$.

The fan-box $g'$ is furnished with an extension $m$, provided with a sliding door $m'$, which may be retained in any required open position by means of the screw $n$ and nuts $n'$.

The scouring-machine may be employed without the grading-machine and brushing and finishing machine for cleaning and clipping oats which would be passed therethrough and treated by the beaters and delivered, the good and heavy grain through the chute $g^3$ and the light grain through the chute $g^2$.

Having now described my invention, what I claim as new, and desire to secure by Letters Patent, is—

The combination, with a conical chamber for the grain having an outlet in the lower part of its larger end, a fan-casing arranged at a short distance from the said larger end, and delivery-chutes arranged under the space between the said larger end and the said casing; of a driving-shaft which extends through the said chamber and fan-casing, a fan-wheel secured on the said shaft inside the fan-casing, agitating devices for the grain secured on the said shaft inside the said chamber, and a hinged valve which controls the said grain-outlet and which projects over one of the said delivery-chutes which also forms the main air-inlet to the eye of the fan-casing, said valve also operating to deflect the grain and to prevent the air-supply being drawn through the said chamber by the fan-wheel.

In testimony whereof I affix my signature in presence of two witnesses.

WILLIAM JONATHAN BOOTH.

Witnesses:
HERBERT MUSTHER,
JOHN CYRIL HARTLEY.